US012798128B2

(12) United States Patent
Horl

(10) Patent No.: US 12,798,128 B2
(45) Date of Patent: Nov. 17, 2026

(54) SCISSORS WHICH CAN BE TRANSFERRED BETWEEN A CUTTING CONFIGURATION AND A SHARPENING CONFIGURATION

(71) Applicant: Horl 1993 GmbH, Freiburg (DE)

(72) Inventor: Otmar Horl, Freiburg (DE)

(73) Assignee: HORL 1993 GMBH (DE)

( * ) Notice: Subject to any disclaimer, the term of this patent is extended or adjusted under 35 U.S.C. 154(b) by 455 days.

(21) Appl. No.: 18/558,881

(22) PCT Filed: May 5, 2022

(86) PCT No.: PCT/EP2022/062110
§ 371 (c)(1),
(2) Date: Nov. 3, 2023

(87) PCT Pub. No.: WO2022/233998
PCT Pub. Date: Nov. 10, 2022

(65) Prior Publication Data

US 2024/0253256 A1 Aug. 1, 2024

(30) Foreign Application Priority Data

May 5, 2021 (DE) ..................... 10 2021 111 591.4

(51) Int. Cl.
*B26B 13/20* (2006.01)
*B26B 13/04* (2006.01)
*B24D 15/06* (2006.01)

(52) U.S. Cl.
CPC .............. *B26B 13/04* (2013.01); *B26B 13/20* (2013.01); *B24D 15/063* (2013.01)

(58) Field of Classification Search
CPC ........ B26B 13/04; B26B 13/20; B24D 15/063
See application file for complete search history.

(56) References Cited

U.S. PATENT DOCUMENTS 1,781,967 A 11/1930 Baltzell
2,198,539 A 4/1940 Klopfer
(Continued)

FOREIGN PATENT DOCUMENTS

CN 107635731 A 1/2018
CN 213106936 U 5/2021
(Continued)

OTHER PUBLICATIONS

Office Action issued in corresponding Japan Patent Application No. 2023-567955, dated Jan. 14, 2025 (10 pages).
(Continued)

*Primary Examiner* — Nathaniel E Wiehe
*Assistant Examiner* — Theodore C Ribadeneyra
(74) *Attorney, Agent, or Firm* — Harness, Dickey & Pierce, P.L.C.

(57) ABSTRACT

A cutting tool can have two blades which each have a cutting edge and which can be moved relative to one another in a cutting configuration in order to cut a material is disclosed. The cutting tool can be reversibly transferred from the cutting configuration to a sharpening configuration in which the blades are separated from one another for sharpening and/or polishing at least one of the cutting edges by a sharpening or polishing device, and each of the blades can be individually placed onto a level surface so that the blade is oriented at a constant working angle in relation to the surface, or in which the blades are locked relative to one another.

25 Claims, 4 Drawing Sheets

(56) References Cited

U.S. PATENT DOCUMENTS

| | | | |
|---|---|---|---|
| 2,518,111 A | 8/1950 | Amendola | |
| 3,293,804 A | 12/1966 | Smith | |
| 2012/0047751 A1 | 3/2012 | Nene et al. | |
| 2014/0251099 A1 | 9/2014 | Covarrubias-Garcia et al. | |

FOREIGN PATENT DOCUMENTS

| | | | | |
|---|---|---|---|---|
| DE | 9113161 | U1 | | 12/1991 |
| EP | 3278928 | B1 | | 2/2021 |
| GB | 1487192 | A | | 9/1977 |
| GB | 2014502 | A | | 8/1979 |
| JP | 3016644 | U | | 10/1995 |
| JP | H09272048 | A | | 10/1997 |
| JP | 2001-190866 | A | | 7/2001 |
| JP | 2006281334 | A | * | 10/2006 |
| JP | 2010-149272 | A | | 7/2010 |
| JP | 2015-167854 | A | | 9/2015 |
| JP | 2019-180938 | A | | 10/2019 |
| TW | 201119813 | A | | 6/2011 |

OTHER PUBLICATIONS

Office Action issued in corresponding Canadian Patent Application No. 3217825, dated Apr. 9, 2025 (3 pages).
International Search Report for PCT/EP2022/062110, mailed on Aug. 30, 2022, 3 pages.
Office Action issued in corresponding Japanese Patent Application No. 2023-567955, dated Jun. 11, 2025 (6 pages).
German Office Action issued in German Application 10 2021 111 591.4, dated Dec. 16, 2021 (8 pages).
Office Action issued in corresponding Chinese Patent Application No. 2022-800333093, dated Aug. 30, 2025 (18 pages).
Australian Offie Action issued in corresponding application AU 2022268604, dated Oct. 29, 2024 (5 pages).
Office Action issued in corresponding Korean Patent Application No. 10-2023-7037791 dated Oct. 2, 2025 (12 pages).
Office Action issued in corresponding Chinese Patent Application No. 2022-800333093, dated Mar. 26, 2026 (8 pages).
Office Action issued in corresponding Israel Patent Application No. 308,239 dated Jun. 7, 2026 (7 pgs).

* cited by examiner

SCISSORS WHICH CAN BE TRANSFERRED BETWEEN A CUTTING CONFIGURATION AND A SHARPENING CONFIGURATION

CROSS-REFERENCE TO RELATED APPLICATIONS

The present application is a U.S. National Phase of International Application No. PCT/EP2022/062110, filed May 5, 2022, which claims priority to German Application No. 10 2021 111 591.4, filed May 5, 2021.

BACKGROUND

The present disclosure relates to a cutting tool, in particular scissors, comprising: two blades which each have a cutting edge and which can be moved relative to one another in a cutting configuration of the cutting tool in order to cut a material.

In order to be able to machine these blades with a sharpening or polishing device, the cutting edges of these blades must be freely accessible. For precise sharpening or polishing, it is also essential to maintain a constant sharpening angle between each blade to be machined and the sharpening or polishing device. Due to the blades which are movable relative to one another, however, sharpening or polishing the cutting edges of scissors is significantly more complex than sharpening or polishing a single, immovable knife edge.

The problem underlying the present disclosure is to facilitate the sharpening or polishing of the cutting edges of a generic cutting tool.

The present disclosure provides a cutting tool, in particular scissors, comprising: two blades which each have a cutting edge and which can be moved relative to one another in a cutting configuration of the cutting tool in order to cut a material, wherein the cutting tool can be reversibly transferred from the cutting configuration to a sharpening configuration, in which the blades are separated from one another for sharpening and/or polishing one of the or both cutting edges by means of a sharpening or polishing device, in particular a roller sharpener, and can each be individually placed on a level surface so that the blade is oriented at a constant working angle in relation to the surface, or in which the blades are locked relative to one another.

Scissors, such as garden shears, are known, which are locked relative to one another for safety reasons in a non-use position, in which both cutting edges lie closed on top of one another. In this state, the scissors adopt a compact configuration and can be easily stowed. In addition, a user cannot injure himself on the cutting edges in the closed position of the blades. However, the blades are not accessible for sharpening or polishing in this state.

Since the two blades of scissors can be moved relative to one another in the cutting configuration, however, the sharpening or polishing angle should/must remain constant, the transferability of the cutting tool to a sharpening configuration in which the blades are separated from or locked to one another and at least one cutting edge is accessible for sharpening or polishing is a decisive advantage when sharpening or polishing the cutting edges. The user can thus concentrate on sharpening or polishing the cutting edges, because the relative orientation of the blades to one another is ensured by the locking of the blades, or each individual blade can be oriented and machined individually. Preferably, each of the blades can be placed stably on the level surface. This means that the blade stands independently on the level surface. For sharpening and/or polishing, the blade should nevertheless be fixed by hand, since the forces exerted on the blade usually exceed the static friction of the blade on the level surface.

In the sharpening configuration, the blade to be machined can be stabilized or supported during sharpening or polishing with the aid of the other blade, or the blade itself can be placed on a level surface in a machinable state, i.e. the blade forms its own sharpening jig. As a result, the cutting tool as a whole is easier to machine in the sharpening configuration than in the cutting configuration in which the two blades can be moved relative to one another.

It can be expedient if the cutting tool, preferably each individual blade, has at least one support section that defines a support plane with which the cutting tool or each individual blade in the sharpening configuration can be placed stably on a level surface, preferably such that at least one of the following requirements is met in the process:

- The blade with the cutting edge to be machined is oriented at a working angle in the range of 10 to 80°, preferably in the range of 25 to 75°, preferably in a working angle of 30 to 60°, particularly preferably in a working angle of 40 to 50°, especially 45°, to the support plane.
- The blades each comprise (i.e. each blade comprises) at least one support section defining the support plane, preferably three support sections each, of which preferably at least one of the support sections lies outside the blade plane and/or protrudes above the blade plane for supporting the blade at least in the sharpening configuration, wherein particularly preferably a maximum protrusion of the support section above the blade plane in the sharpening configuration is in the range of 20 to 90%, preferably 40 to 70%, of the maximum width of the blade (measured between cutting edge and blade back).
- The cutting tool comprises a total of at least three support sections defining the support plane, which do not lie on one line.
- The cutting edge to be machined extends in a plane that is oriented at an angle of maximally 10°, preferably maximally 5°, preferably 0°, or parallel to the support plane.
- The cutting edge to be machined has a distance in the range of 5 to 50 mm, preferably a distance in the range of 10 to 30 mm, preferably 15 to 25 mm from the support plane.
- When projected onto the support plane, the cutting edge to be machined, starting from an intersection with the other cutting edge, lies completely outside the other blade.
- A distal portion of the blade with the cutting edge to be machined rests on a distal portion of the other blade, preferably planarly.
- When projected onto the support plane, the support section lies below the blade and/or does not protrude above the blade or cutting edge.

With these requirements met, the blade is optimally oriented with the cutting edge to be machined for sharpening or polishing with a sharpening or polishing device. Preferably, the cutting tool has at least one separate support section for each cutting edge, which defines a separate support plane for this cutting edge.

It may also prove useful if each of the blades has the cutting edge at one end thereof and a handle at another end thereof. This makes the cutting tool easy to use, especially in the cutting configuration. Preferably, a support section is located on the handle of each blade. Preferably, another support section is located on the back of each blade or on the side of the blade facing away from the cutting edge.

It can also be preferred if the cutting tool is configured as pivoted scissors and the blades in the cutting configuration are arranged on an axis disposed in each case between the handle and the cutting edge in a crosswise manner and are rotatably mounted relative to one another such that the handles and the cutting edges of both blades (in pairs) are in each case opposite one another, wherein preferably the cutting tool comprises at least one support section protruding along the axis, which in particular is formed as part of the axis or is detachably coupled to the cutting tool, wherein preferably the axis for transferring the cutting tool between the cutting configuration and the sharpening configuration is detachable from at least one of the blades so that the blades can be separated from one another and/or locked in a different configuration relative to one another, wherein preferably the axis comprises two detachably couplable parts, in particular a screw bolt and a matching cap nut, or wherein the axis is attached to one blade and forms the male part of a bayonet lock which is detachably coupled to a female part of the bayonet lock on the other blade. Pivoted scissors are versatile, easy to handle and particularly common in practice. In a preferred embodiment, each blade includes a support section on the handle, another support section on the back of the blade, and yet another support section in extension of the axis. These three support sections preferably form a support plane for stable three-point support of the blade in the sharpening configuration, especially when the blades are separated from one another in the sharpening configuration. In this case, the support section in the extension of the axis forms a kind of “pillar” outside the other two support sections, which lie in or close to the blade plane. It can be expedient if the support section in the extension of the axis does not protrude above the cutting edge when projected onto the support plane. This prevents the roller sharpener from abutting against this support section during sharpening or polishing of the blade. It may be advantageous if an axial protrusion of the support section in extension of the axis above the blade plane in the cutting configuration and/or in the sharpening configuration is in the range of 20 to 90%, preferably 40 to 70% of the maximum width of the blade measured between the cutting edge and the back of the blade. It can be helpful for this purpose if the support section is flattened or forms a kind of V-edge at the end facing away from the blade. In a preferred embodiment, the axis is attached to one blade and forms the male part of a bayonet lock that is detachably coupled to a female part on the other blade. In this context, the axis can have a “key” at the distal end, for example, which fits into or can be detached from an associated “lock” on the other blade, for example, in a position in which the blades describe an opening angle in the range of 120 to 1800 or 140 to 160° to one another. This can prevent the blades from being unintentionally separated from one another in the cutting configuration. However, it may also be expedient for the cutting tool to include a detachable cover for the axis and for said cover to include at least one support section. Preferably, each of the blades has such a cover or the cover can be coupled to each of the blades.

However, it may also be convenient if each of the blades includes a blade body comprising the cutting edge, wherein preferably the blade body of one blade at least partially overlaps and/or contacts the handle of the other blade in the sharpening configuration, wherein preferably each of the handles comprises a handle opening and the blade body of one blade at least partially covers the handle opening of the other blade in the sharpening configuration (in particular when viewed along the axis). In this arrangement, for example, an opening angle of the two cutting edges in the sharpening configuration can be maximized. However, an important idea of the disclosure is also to couple the two blades of the cutting tool to one another for sharpening and/or polishing in such a way that one blade serves as a stable bearing or support for sharpening or polishing the other blade or the cutting edge arranged thereon. This enables particularly precise sharpening or polishing. The support sections are preferably located on the handle, preferably on the side of the handle facing away from the other blade. If the blade body of the blade to be machined overlaps, in particular in the direction of the axis or when projected onto the support plane, and/or contacts the handle of the other blade, the blade body of the blade to be machined can be directly supported or deposited on the handle of the other blade. In this way, the opening angle of the two cutting edges can be further increased in the machining position. In the machining position, the handle openings are generally not required and can therefore be covered by the blade body of the other blade in order to maximize the opening angle of the two cutting edges. If the two blades are connected at a common axis of rotation, sharpening or polishing of the cutting edge to be machined may cause vibrations on the blade to be machined. By placing the blade body of the blade to be machined on the handle of the other blade, these vibrations can be dampened or even prevented. Ideally, both handles are made of an elastic material (plastic) and/or have at least one elastic support section (e.g. silicone pad or magnet with elastic coating) on the contact side to the blade body of the other blade. This support section can serve both as a bearing for the blade to be machined and as a lock for the blades in the machining position. It is also possible to couple the two blades to one another in a disassembled state, in which they are not connected via a common axis of rotation, in such a way that the blade to be machined is supported on the other blade and is supported by the same. In particular, this makes it possible to increase the footprint of the cutting tool—or the area enclosed by the support sections defining the support plane—in order to improve the stability of the cutting tool in the sharpening configuration.

It may be convenient if the blades in the cutting configuration for cutting the material between an open position, in which the material can be arranged between the cutting edges, and a closed position, in which the cutting edges lie directly one above the other, can be reversibly transferred, wherein the cutting tool in an open position of the blades, preferably a maximum open position of the blades, can be transferred to the sharpening configuration by locking the blades. As a result, the maximum space between the open cutting edges is available for sharpening or polishing. Alternatively, an opening angle of the two cutting edges in the sharpening configuration is larger than an opening angle in the maximum open position of the blades in the cutting configuration. This can prevent the blades from being unintentionally transferred from the cutting configuration to the sharpening configuration, or vice versa, because this is undesirable when operating the cutting tool.

It can be advantageous if the two cutting edges in the sharpening configuration include an opening angle in the range of 1350 to 180°, preferably in the range of 1500 to 180°, in particular with respect to a common axis of rotation of the blades. This makes the cutting edges particularly accessible for sharpening or polishing and makes sharpening or polishing particularly easy.

It may prove useful if the blades are locked magnetically or mechanically in the sharpening configuration. Magnetic locking of the two blades is particularly easy to establish and release, especially tool-free. Other locks are also possible. Mechanical locking, e.g. by means of a screw, is particularly secure in order to withstand even a considerable force acting on the blades during sharpening or polishing.

It may be useful if the blades for transferring the cutting tool from the cutting configuration to the sharpening configuration can be detached from one another and coupled to one another in a different arrangement, wherein preferably the blade bodies of the blades in the sharpening configuration are oriented in different, non-parallel planes, in particular transversely or perpendicularly to one another, preferably such that the blades are arranged approximately in a T-shape. As a result, the cutting tool in the sharpening configuration can have a particularly stable footing on a level surface in order to be machined with the sharpening or polishing tool. Moreover, the cutting edge to be machined is particularly easily accessible in this arrangement. In this embodiment, it can be particularly advantageous if the blades are coupled to one another in a disassembled state in such a way that the blade to be machined rests with its blade body, preferably with the opening that accommodates the common axis of rotation in the cutting configuration of the cutting tool, on the handle end or back of the other blade not to be machined and is held there magnetically or mechanically. In this context, the blade body of the blade to be machined is oriented at a working angle of ideally 40 to 500 to the support plane or surface in such a way that the cutting edge to be machined faces the support plane or surface. The sharpening or polishing device can then be moved along the cutting edge to be machined in order to sharpen it by removing or abrading blade material.

It can be useful if for locking the blades in the machining position a blade body of one blade can be coupled with a handle of the other blade. Since the handle is usually located at the end of the blade and the blade body at the other end, coupling the handle and blade body can provide a particularly stable locking of the blades in the machining position. In addition, the free length of the blades, which are otherwise only connected at the common axis, is reduced. As a result, the vibrations caused by sharpening or polishing can be damped on the blade to be machined.

Another independent aspect of the present disclosure relates to a method of sharpening and/or polishing a cutting tool, in particular according to one of the preceding embodiments, having two blades each having a cutting edge, wherein the blades can be moved relative to one another in a cutting configuration of the cutting tool for cutting a material, wherein the method comprises:

Step A: Transferring the cutting tool from the cutting configuration to a sharpening configuration in which the blades are separated from each other and can each be individually placed onto a level surface so that the blade is oriented at a constant working angle in relation to the surface, or in which the blades are locked relative to one another.

Step B: Sharpening and/or polishing one of the or both cutting edges in the sharpening configuration with a sharpening or polishing device, in particular with a roller sharpener.

Step C: Transferring the cutting tool from the sharpening configuration to the cutting configuration.

It may prove helpful if the blade with the cutting edge to be machined (or the blade to be machined) is supported on the other blade in step B, preferably on the handle of the other blade, preferably on the end of the other blade facing away from the cutting edge. As a result, the cutting tool has a particularly stable footing in the sharpening configuration.

It can be useful if the cutting tool or at least the blade to be machined is held lying stably on a level surface in step B, so that the blade is oriented with the cutting edge to be machined at a working angle in the range from 10 to 80°, preferably in the range from 15 to 75°, preferably at a working angle in the range from 30 to 60°, particularly preferably at a working angle in the range from 40 to 40°, especially 45°, in relation to the surface. This makes it easier to maintain a constant working angle during machining of the cutting edge to be machined.

It may also prove useful if the blade body of the blade with the cutting edge to be machined is arranged in step B such that the handle of the other blade is located, at least in sections, between this blade body and the surface, wherein preferably the blade body of the blade with the cutting edge to be machined rests on the handle of the other blade, preferably rests planarly. As a result, the blade body of one blade can be stably supported on the handle of the other blade in the sharpening configuration.

It can be expedient if the cutting edge to be machined is held in abutment against a sharpening or polishing surface of the sharpening or polishing device in step B and the sharpening or polishing device is thereby moved along this cutting edge, preferably alternately in a first direction leading towards the handle of the blade and a second direction leading away from the handle of this blade, or repeatedly in one of these two directions. As a result, a particularly good sharpening or polishing result can be achieved.

It can also be useful if in step C both cutting edges are sharpened or polished in the same sharpening configuration of the blades. This facilitates the sharpening and/or polishing of both cutting edges of the cutting tool, because the sharpening configuration of the cutting tool can be maintained and only the position of the sharpening or polishing device has to be changed.

It can be advantageous if the positions of the blades are exchanged between the machining of one cutting edge and the machining of the other cutting edge, preferably such that in each case the blade not to be machined supports the blade to be machined. For example, the handle of the blade body with the cutting edge not to be machined can serve as a bearing for the blade body with the cutting edge to be machined.

A further independent aspect of the disclosure relates to a set comprising a cutting tool according to one of the preceding embodiments and a sharpening jig, by means of which each of the blades in an assembled or disassembled state of the cutting tool can be arranged on a level surface in such a way that the blade is oriented at a working angle in the range from 10 to 80°, preferably in the range from 25 to 75°, preferably in an working angle of 30 to 60°, particularly preferably in a working angle of 45° in relation to the surface, wherein preferably the sharpening jig is fixedly connected to the cutting tool at least in the cutting configuration and/or is adjustable in relation to at least one of the blades for transferring the sharpening jig into the sharpening configuration. In particular, the sharpening jig can be formed at least partially by a support section protruding along the axis, which, at least in the cutting configuration, protrudes above the blade to be machined so as to define a support plane alone or, if necessary, in conjunction with other support sections, e.g., on the handle and/or blade back of the blade to be machined.

Preferably, this set also comprises a sharpening and/or polishing device, in particular in the form of a roller sharpener as known for e.g. from EP 3 278 928 B1, wherein this sharpening and/or polishing device has at least one sharpening or polishing surface which, when the sharpening and/or polishing device is rolled on a level surface, rotates in a plane oriented perpendicularly to this surface.

Further preferred embodiments result from combinations of the features disclosed in the description and Figures.

Terms and Definitions

Open position is a position of the blades in which the cutting edges of the blades are accessible for sharpening and/or polishing or for disposing a material to be cut between the cutting edges.

Locked state is a state in which the blades are in the sharpening configuration and therefore cannot be moved relative to one another.

Reversibly transferable means that the cutting tool cannot only be transferred from the cutting configuration to the sharpening configuration, but also from the sharpening configuration back to the cutting configuration. These transfers can preferably be repeated as often as required.

Stable means that the cutting tool rests on a level, horizontal surface, preferably without tilting and without any separate force being applied by its own weight alone.

DETAILED DESCRIPTION OF THE PREFERRED EMBODIMENTS

Preferred embodiments of the present disclosure are described in detail below with reference to the accompanying Figures.

Figure 1:
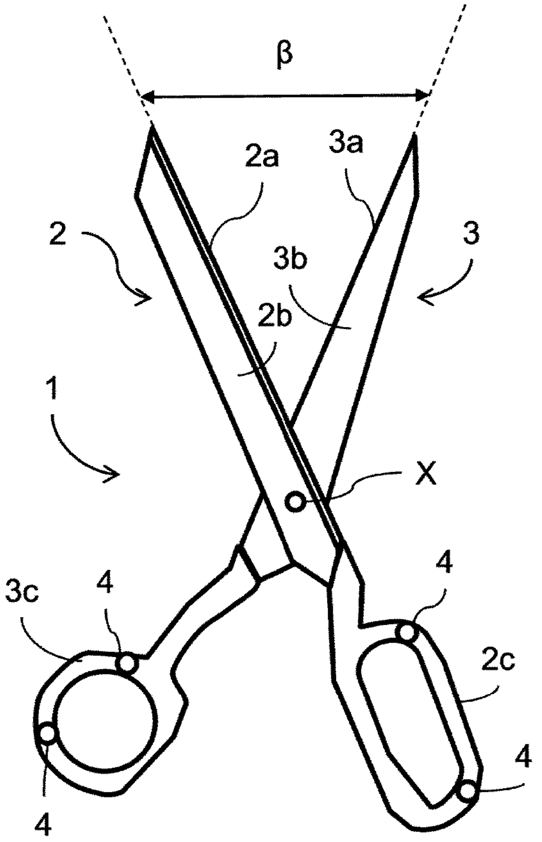
FIG. 1 shows an exemplary cutting tool in the form of pivoted scissors with two blades mounted crosswise on a common axis of rotation in a cutting configuration in the partially open position, wherein the direction of view is along or parallel to the axis of rotation.
Figure 2:
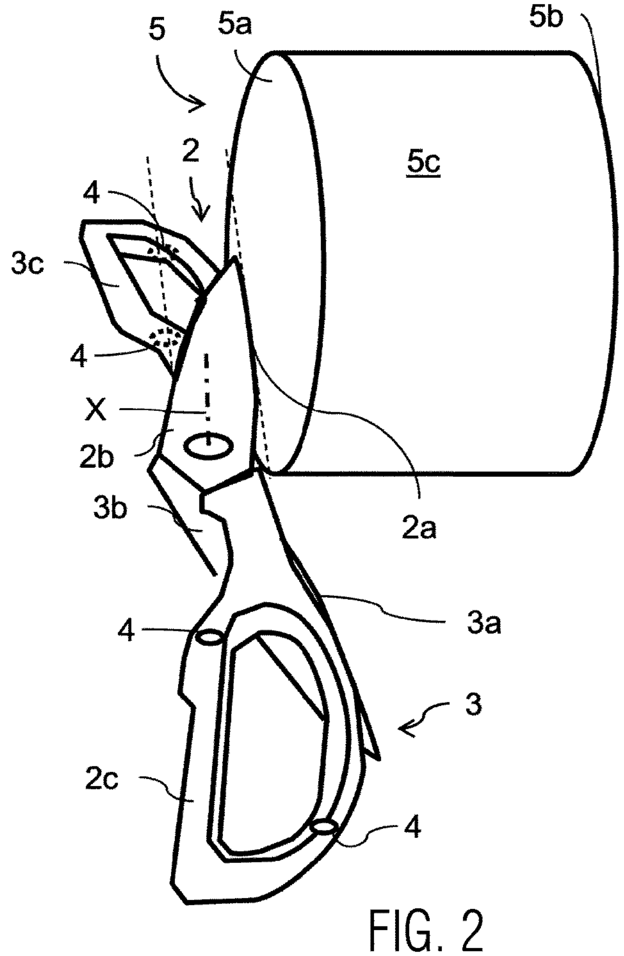
FIG. 2 shows a further exemplary cutting tool in the form of pivoted scissors with two blades mounted crosswise on a common axis of rotation, wherein the blades are locked relative to one another in a sharpening configuration and wherein the blade body of the upper blade rests on the handle of the lower blade, while the cutting edge of the upper blade is machined with a roller sharpener shown schematically.

First Embodiment (FIGS. 1 to 5): Sharpening Configuration in the Assembled State FIG. 1 shows a cutting tool 1 according to the first embodiment of the disclosure, wherein the cutting tool 1 has the shape of scissors 1. The scissors 1 are configured as pivoted scissors 1 and have two blades 2, 3, each with a cutting edge 2*a*, 3*a*, which can be moved relative to one another in a cutting configuration. Each of the blades 2, 3 comprises a blade body 2*b*, 3*b* with the cutting edge 2*a*, 3*a* at one end thereof and a handle 2*c*, 3*c* at another end thereof. In the cutting configuration, the blades 2, 3 are arranged crosswise on an axis X respectively arranged between the handle 2*c*, 3*c* and the cutting edge 2*a*, 3*a* and rotatably supported to one another such that the handles 2*c*, 3*c* and cutting edges 2*a*, 3*a* of the blades 2, 3 respectively face each other in pairs, as shown in FIG. 1. For cutting a material, the blades 2, 3 are reversibly transferable in the cutting configuration between an open position, in which the material to be cut can be arranged between the cutting edges 2*a*, 3*a*, and a closed position, in which the cutting edges 2*a*, 3*a* lie directly on top of one another.

According to the disclosure, the cutting tool 1 can be reversibly transferred from the cutting configuration into a sharpening configuration in which the blades 2, 3 are locked relative to one another for sharpening and/or polishing one of the or both cutting edges 2*a*, 3*a* with a sharpening or polishing device 5, in particular with a roller sharpener 5. The locking can be accomplished, e.g., by magnetically or mechanically coupling the blades 2, 3 to each other in their maximum open position, e.g., by mechanical or magnetic coupling between the handle 2*c*, 3*c* of one blade and the blade body 2*b*, 3*b* of the other blade 2, 3.

The sharpening configuration corresponds here to a maximum open position of the blades 2, 3 locked to one another, wherein the cutting edges 2*a*, 3*a* enclose an opening angle R of approx. 1650 and are optimally accessible for processing with the sharpening or polishing device 5.

The scissors 1 comprise a plurality of support sections 4 on each handle 2*c*, 3*c*, which define a support plane AE with which the cutting tool 1 can be placed stably on a level surface U in the sharpening configuration in a locked state. In the machining position, the blade 2, 3 is oriented with the cutting edge 2*a*, 3*a* to be machined at a working angle $\alpha$ in the range of, e.g., 15 or 200 in relation to the support plane AE. When projected onto the support plane AE (viewing direction P in FIG. 3), the cutting edge 2*a*, 3*a* to be machined, starting from a point of intersection with the other cutting edge 2*a*, 3*a*, lies completely outside the other blade 2, 3. Ideally, the cutting edge 2*a*, 3*a* to be machined extends at a distance of about 20 mm parallel to the support plane AE or base U. Thus, the cutting edge 2*a*, 3*a* to be machined is optimally accessible for machining with the sharpening or polishing device 5.

Figure 3:
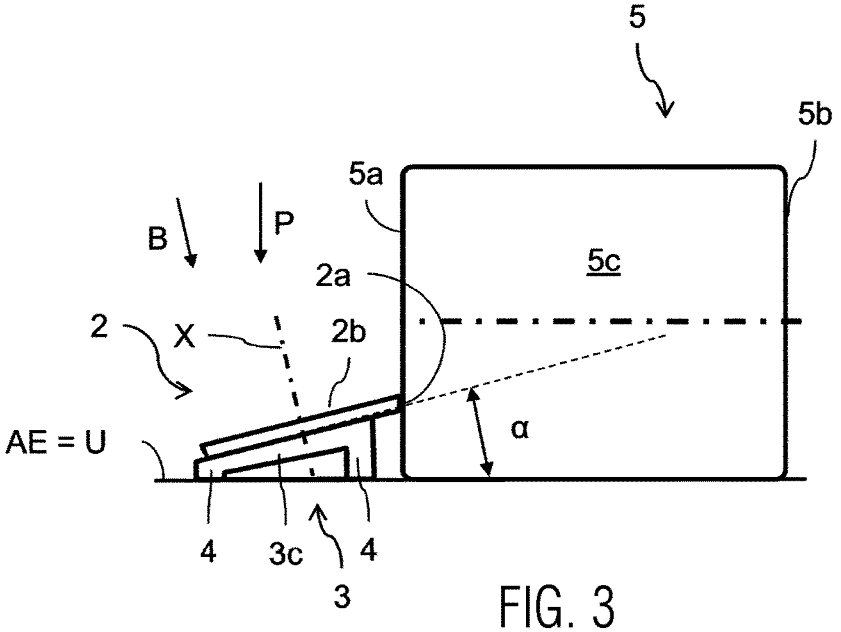
FIG. 3 shows a schematic side view of the arrangement shown in FIG. 2, in which the cutting edge of the upper blade is machined with a roller sharpener, wherein the blade body of the upper blade is oriented at a working angle of 15 or 200 in relation to a level surface, wherein the handle of the lower blade rests stably on the surface with support sections defining a support plane and thereby supports the blade body of the upper blade, wherein the cutting edge of the upper blade protrudes above the handle of the lower blade when projected onto the support plane and is thus optimally accessible for the roller sharpener.
Figure 4:
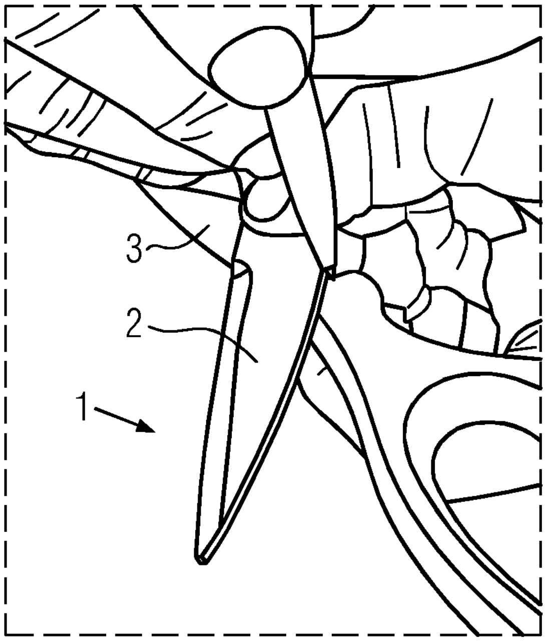
FIG. 4 shows a photographic image of a cutting tool in the sharpening configuration, wherein the blades are locked in a maximum open position relative to one another, wherein a user holds the cutting tool in his hand and indicates the stop for the maximum opening angle of the blades with a pin tip.
Figure 5:
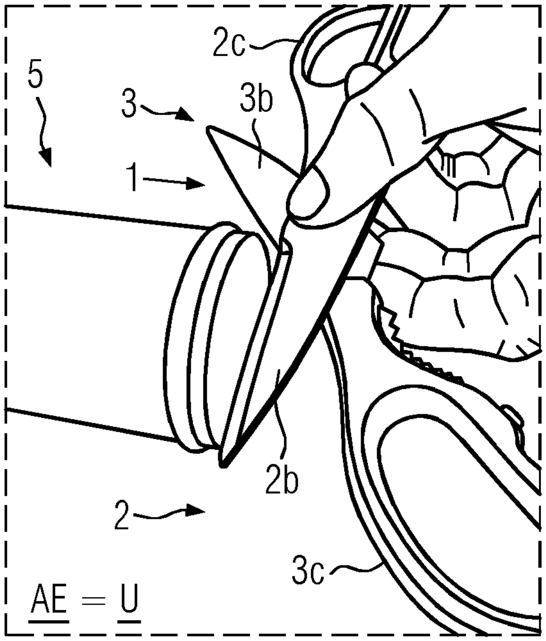
FIG. 5 shows a photographic illustration of the cutting tool according to FIG. 4 in the sharpening configuration during sharpening with a roller sharpener.

In the sharpening configuration, the blade body 2*b*, 3*b* of one blade 2, 3 overlaps the handle 2*c*, 3*c* and a handle opening of the other blade 2, 3 at least in sections when viewed along the axis X (viewing direction B in FIG. 3).

One important idea of the disclosure is to lock the two blades 2, 3 of the cutting tool 1 in the sharpening configuration such that in each case the blade 2, 3 not to be machined serves as a stable bearing during sharpening and/or polishing of the blade 2, 3 to be machined. Although the two blades 2, 3 can be moved relative to one another in the cutting configuration, however, the sharpening angle for machining the cutting edges 2*a*, 3*a* should remain constant. For this reason, the cutting tool 1 according to the disclosure can be transferred to the sharpening configuration in which a movement of the two blades 2, 3 is blocked by the lock in order to facilitate the sharpening and/or polishing of one of the or both cutting edges 2*a*, 3*a*.

In the sharpening configuration shown schematically in FIG. 3, the blade 2, 3 is oriented with the cutting edge 2*a*, 3*a* to be machined at a working angle $\alpha$ of 15 or 200 to the surface U. The working angle $\alpha$ corresponds to the angle which the blade body 2*b* of the upper blade 2 to be machined encloses with respect to the surface U. The handle 3*c* of the lower blade 3 not to be machined, serves as a support and ramp for the upper blade 2 to be machined 2. In this context, the cutting tool 1 rests on the surface U with the support sections 4 or the support plane AE formed thereby.

To machine the cutting edge (3*a*) of the other blade 3, the cutting tool 1 can be turned over so that the previously lower blade 3 lies on top and the previously upper blade 2 rests on the surface U with its own support sections 4 defining its own support plane AE.

In a method according to the disclosure for sharpening and/or polishing the cutting edges 2*a*, 3*a* of this cutting tool 1, the cutting tool 1 is first transferred from the cutting configuration to the sharpening configuration (step A). In this sharpening configuration, the blades 2, 3 are locked relative to one another so that a relative movement of the blades 2, 3 is blocked. Subsequently, the cutting edges 2*a*, 3*a* are sharpened and/or polished in the sharpening configuration with a sharpening or polishing device 5, in particular with a roller sharpener 5 (step B). For this purpose, the cutting tool 1 is stably placed with the support sections 4 on a level surface U, so that the blade 3 not to be machined, here e.g. its handle 3*c*, serves as a bearing and ramp for the blade 2 to be machined (cf. FIG. 3). The handle 3*c* of the blade 3 not to be machined is thereby located in sections between the blade body 2*b* of the blade 2 to be machined and the surface U.

A roller sharpener 5, as schematically shown in FIG. 3, comprises a cylindrical device body 5*c* and two sharpening or polishing surfaces 5*a*, 5*b* arranged on the end faces of the device body 5*c*. These sharpening or polishing surfaces 5*a*, 5*b* rotate in a (vertical) plane perpendicular thereto when the roller sharpener 5 rolls on the level, horizontal surface U. Such roller sharpeners 5 are known, for example, from DE 297 03 326 U1 or EP 3 278 928 B1.

In the sharpening configuration, the cutting edge 2*a* to be machined of the cutting tool 1 is held in abutment against the rotating sharpening or polishing surface 5*a*, 5*b* of the sharpening/polishing device 5. The sharpening/polishing device 5 is thereby repeatedly moved along this cutting edge 2*a*, e.g. alternately in a first direction leading towards a handle 2*c* of the blade 2 and a second direction leading away from the handle 2*c* of this blade 2. Alternatively, the sharpening/polishing device 5 may be repeatedly moved along this cutting edge 2*a* in one of these two directions.

If in step B both cutting edges 2*a*, 3*a* are sharpened or polished in the same sharpening configuration of the blades 2, 3, the cutting tool 1 can be turned over between the machining of one cutting edge 2*a* and the machining of the other cutting edge 3*a*, so that in each case the blade 2, 3 not to be machined rests on the surface U and supports the blade 2, 3 to be machined. After completion of sharpening or polishing, the cutting tool 1 is transferred from the sharpening configuration to the cutting configuration again by releasing the locking of the blades 2, 3 (step C), so that the blades 2, 3 can be moved relative to one another again.

Second Embodiment (FIGS. 6 and 7): Sharpening Configuration in the Disassembled State In a second embodiment, which is described below with reference to FIGS. 6 and 7, the blades 2, 3 are detachable from one another for transferring the cutting tool 1 from the cutting configuration to the sharpening configuration and can be coupled to one another in a different arrangement.

High-quality scissors usually have a sharpening angle of more than 25°, ideally 45°. The handle 2*c*, 3*c* of the blades 2, 3 would have to become comparatively thick to create a 45° bevel in such a way that the sharpening/polishing tool 5 can still be well applied and sharpened.

In the alternative embodiment, the blades 2, 3 of the scissors 1 can therefore be disassembled at the pivot or axis of rotation X by means of a special screw. At the end of each handle 2*c*, 3*c* of the two blades 2, 3 or scissors jaws, a thread (e.g. insert nut) or a magnet is incorporated in the correct angular position so that the other blade 2, 3 or scissors jaw can be screwed tight or clipped on via the magnet in such a way that the correct sharpening angle is automatically produced on the cutting edge 2*a*, 3*a*.

Figure 6:
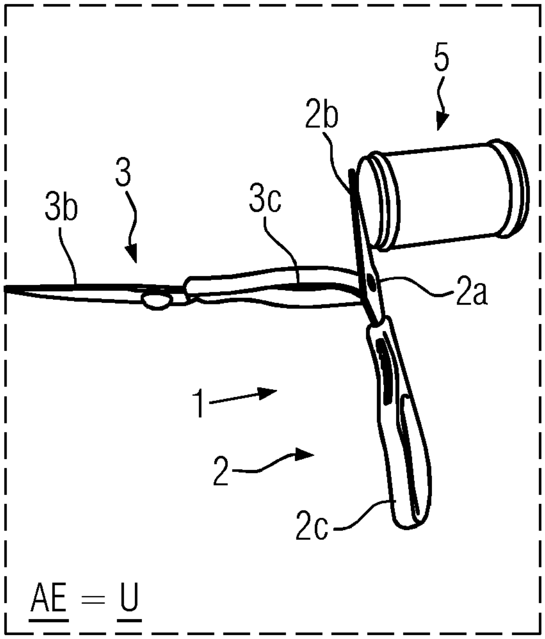
FIG. 6 shows a photographic illustration of a cutting tool according to an alternative embodiment in the sharpening configuration, wherein the blades are locked in a different arrangement relative to one another in a decoupled state, wherein the blade to be machined is supported with its blade body on the handle back of the blade not to be machined and is oriented approximately in a perpendicular plane to the blade body of this blade, wherein the cutting edge to be machined faces the surface and the blade body is oriented at the intended working angle of 40 to 50° in relation to the surface.
Figure 7:
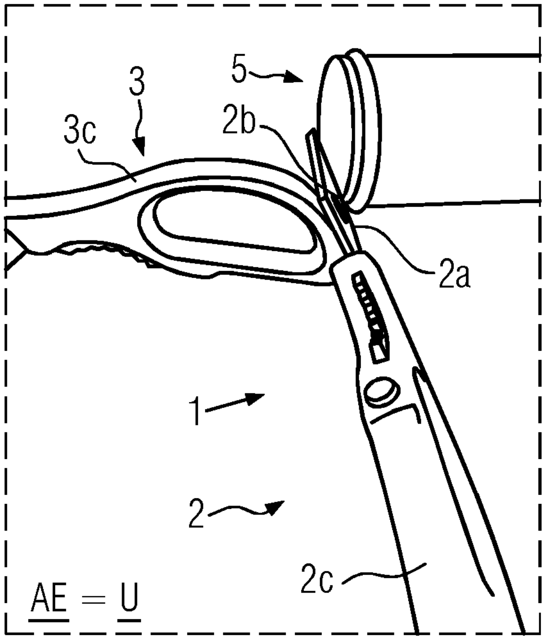
FIG. 7 shows an enlarged detailed view of the arrangement in FIG. 6.
Figure 8:
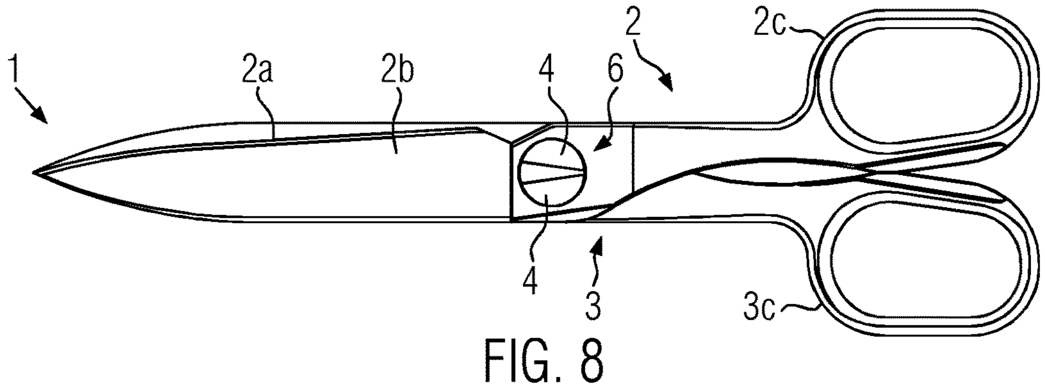
FIG. 8 shows a computer-generated, schematic top view of a cutting tool according to a further embodiment of the disclosure, with the direction of view perpendicular to the planes of the blade bodies or the plane of the scissors movement, wherein the cutting tool is configured as pivoted scissors and the blades in the cutting configuration are arranged crosswise on an axis arranged in each case between the handle and the cutting edge and are mounted so as to be rotatable relative to one another in such a way that the handles and the cutting edges of the two blades are opposite one another in each case, wherein the cutting tool has a support section protruding along the axis, which in the sharpening configuration together with further support sections on the handle and on the back of the blade defines a support plane for placing the blade to be machined on a level surface.
Figure 9:
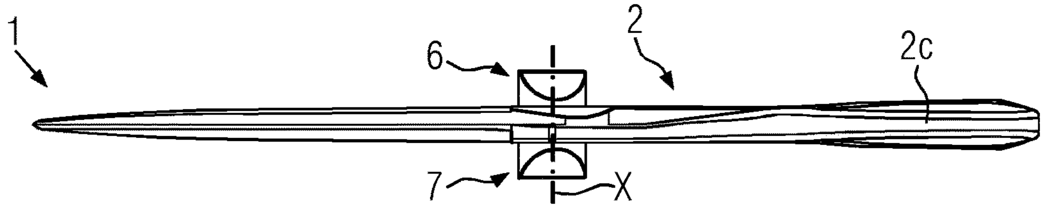
FIG. 9 shows a computer-generated, schematic side view of the cutting tool according to FIG. 8 with the viewing direction parallel to the planes of the blade bodies or parallel to the plane of the scissors movement.

The sharpening configuration of the cutting tool 1 is shown in FIGS. 6 and 7. In the sharpening configuration, the blade bodies 2*b*, 3*b* of the blades 2, 3 are arranged approximately in a T-shape and oriented in different, non-parallel planes. In this context, the blade 2 to be machined is arranged, e.g., transversely or perpendicularly to the blade 3 not to be machined at its handle end 3*c* and is supported with its blade body 2*c* against the handle end 3*c* of the blade 3 not to be machined. The handle end 3*c* of the blade 3 not to be machined is configured—as mentioned—so as to support and magnetically or mechanically hold the blade body 2 to be machined in order to orient it at a working angle of 45° to the surface U, so that the cutting edge 2*a* to be machined faces the surface U.

Third Embodiment: Sharpening Configuration with Sharpening Jig (not Shown)

As an alternative to the embodiment shown in FIGS. 6 and 7, the cutting tool 1 can be positioned in an assembled state—or each blade 2, 3 individually in a disassembled state—by means of a sharpening jig (not shown) such that the blade 2, 3 to be machined is oriented at the intended working angle of approx. 40 to 50° with respect to the surface U. As a result, the intended sharpening angle to the rotating sharpening or polishing surface 5*a/b* of the roller sharpener 5, which is aligned perpendicular to the surface U, can be set in a targeted manner. The sharpening jig can be an integral part of the cutting tool 1, especially in the cutting configuration. For transferring to the sharpening configuration, the sharpening jig can, for example, be detached from at least one of the blades 2, 3 or adjusted relative to at least one of the blades 2, 3.

Fourth Embodiment (FIGS. 9 to 15): Support Section Along the Axis

The fourth embodiment of the disclosure is described in detail below with reference to FIGS. 8-15. For identical features, identical reference signs as in the preceding embodiments are used and a repeated description is omitted.

Figure 14:
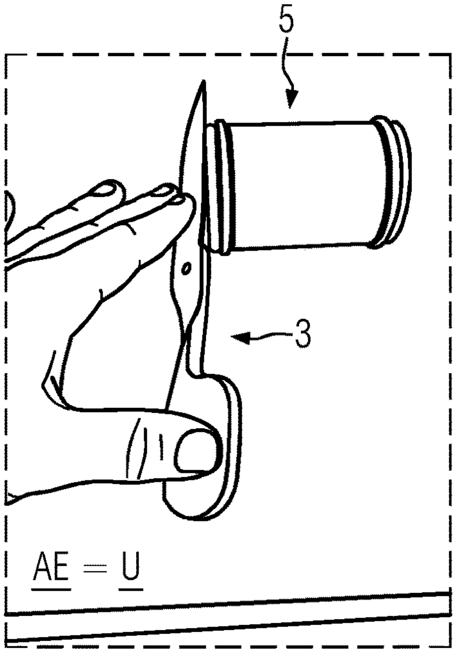
FIG. 14 shows a photographic illustration of one of the blades of the sharpening device schematically shown in FIGS. 8 to 10 in the sharpening configuration in combination with a sharpening or polishing device in the form of a roller sharpener, wherein the blade is detached from the other blade of the cutting tool and is supported by a support section protruding along the pivot axis of the cutting tool on the level surface and rests stably on the surface for sharpening and/or polishing this blade, wherein the cutting edge of the blade to be machined is held in abutment against a sharpening or polishing surface of the sharpening or polishing device by a user whose hand is partially visible in the photographic illustration.
Figure 15:
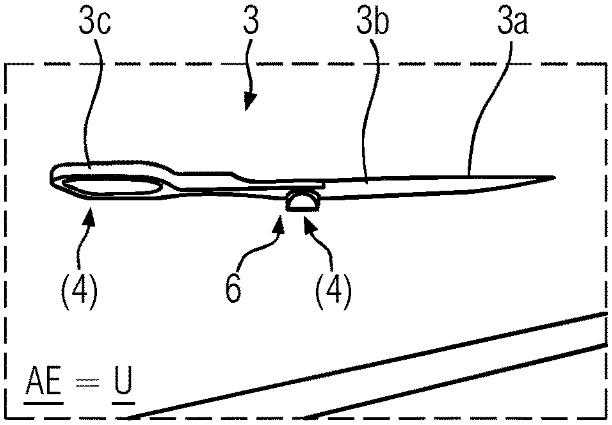
FIG. 15 shows the blade shown in FIG. 14 without sharpening or polishing device from a different perspective.

The cutting tool 1 according to the fourth embodiment is configured as pivoted scissors and is shown in FIGS. 8 to 13 in various computer-aided designs (CAD) and in FIGS. 14 and 15 in photographic illustrations, at least in sections.

In the cutting configuration, the blades 2, 3 of the pivoted scissors are arranged crosswise on an axis X arranged in each case between the handle 2*c*, 3*c* and the cutting edge 2*a*, 3*a* and are mounted rotatably relative to one another such that the handles 2*c*, 3*c* and the cutting edges 2*a*, 3*a* of both blades 2, 3 are opposite one another in each case.

In the present case, the axis X is formed, for example, as a screw axis with a screw bolt and cap nut, which are formed as parts 6, 7 protruding along the axis X over the blades 2, 3 and are detachable from one another for transferring the cutting tool 1 from the cutting configuration to the sharpening configuration. The screw bolt 6 includes a head and an externally threaded shank extending therefrom. The shank can be screwed into a complementary threaded receptacle of the cap nut 7 with internal thread. In the connected state or in the cutting configuration, the screw bolt 6 and cap nut 7 protrude in the axial direction on both sides above the blades 2, 3 (cf. FIGS. 8 and 9).

In an alternative embodiment (not shown), the blades 2, 3 are detachably coupled via a bayonet lock. The axis X thereby forms the male part of the bayonet lock and is firmly connected to one of the blades 2, 3. At the distal end, the axis X has an engagement profile—or "key"—which, in a certain rotational position, fits into or can be released from a receiving profile—or "lock"—on the other blade, which forms the female part of the bayonet lock. This bayonet lock can be covered by fitted caps which form the parts 6, 7 protruding along the axis X over the blades 2, 3.

Figure 10:
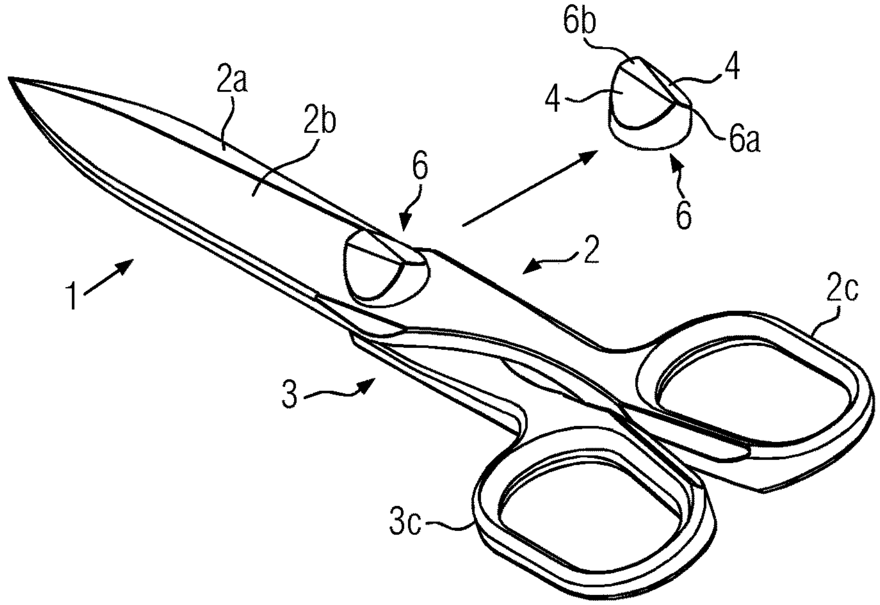
FIG. 10 shows a computer-generated, perspective and schematic view of the cutting tool according to FIGS. 8 and 9.
Figure 11:
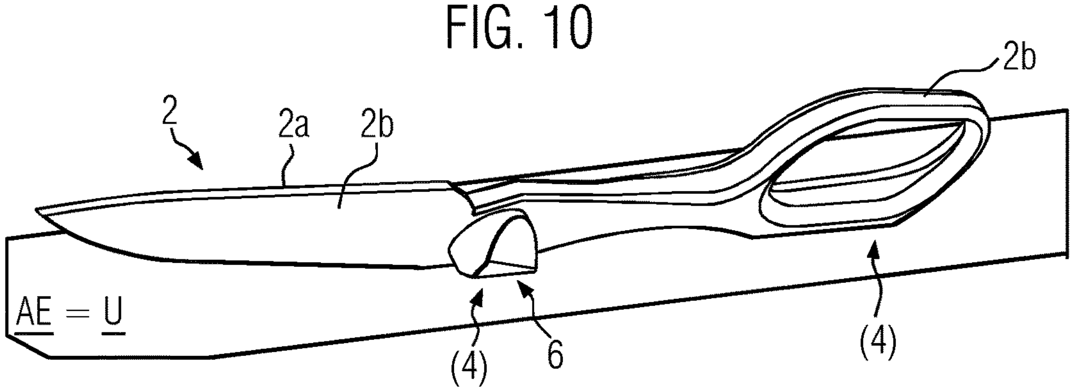
FIG. 11 shows in a computer-generated, perspective and schematic view a sharpening arrangement with a blade of the cutting tool according to FIGS. 8 to 10 in the sharpening configuration, which is positioned on a level surface, wherein the blade is detached from the other blade of the cutting tool and is supported on the level surface by a support section protruding along the pivot axis of the cutting tool and rests stably on the surface for sharpening and/or polishing this blade.
Figure 12:
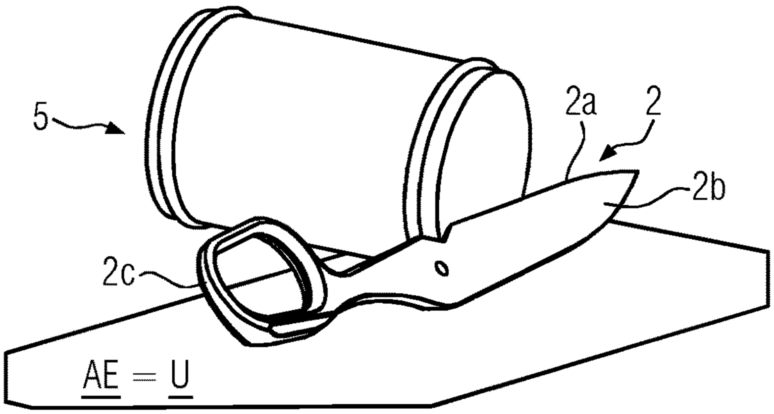
FIG. 12 shows the arrangement according to FIG. 11 from another viewing angle in combination with a sharpening or polishing device in the form of a roller sharpener, wherein the cutting edge of the blade to be machined is held in abutment against a sharpening or polishing surface of the sharpening or polishing device.
Figure 13:
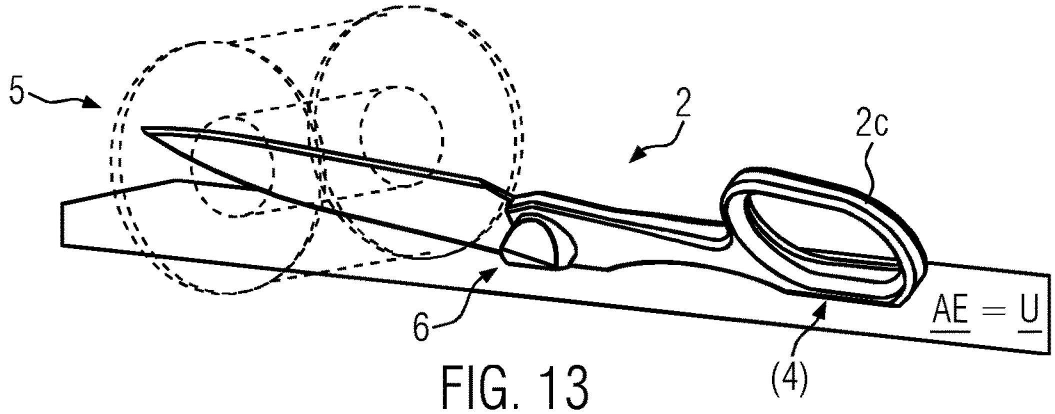
FIG. 13 shows the arrangement according to FIG. 12 again from a different viewing angle, wherein the sharpening or polishing device in the form of the roller sharpener is shown semi-transparently.

The parts 6, 7 of the cutting tool 1 protruding along the axis X are shaped approximately identically or mirror-symmetrically, in particular tapered in a wedge shape towards the ends facing away from one another. These parts 6, 7 have the function of a "sharpening jig" to support each of the blades 2, 3 in the sharpening configuration at a constant working angle α of, for example, 45° with respect to the level surface U. The shapes of the parts 6, 7 may be selected independently of one another. The wedge shape of the parts 6, 7 is defined by two side flanks which form flat support sections 4 and meet at a vertex 6*a*. Starting from this vertex 6*a*, the side flanks have an increasing distance from one another to form a V-shaped edge which includes a flattening 6*b* (FIG. 10).

In the sharpening configuration, the two blades 2, 3 are detached from each other.

The side flank of the part 6 facing away from the cutting edge 2*a* of the blade 2 forms a support section 4 which, together with other support sections 4, e.g. on the back of the handle 2*c* and possibly on the back of the blade body 2*b*, defines a support plane AE with which the blade 2 can be supported on the level surface U in order to be held at a constant working angle in relation to the level surface U. The vertex 6*a* of the part 6 points toward the handle 2*c* of the blade 2.

The part 6 is preferably rotatable with respect to the corresponding blade 2 so that it can orient itself until the side flank forming the support section 4 lies exactly in a support plane AE with the other support sections 4 of the blade 2 to be machined. In the desired rotational position, the part 6 can preferably be locked with respect to the blade 2 so that no unintentional rotation with respect to the blade 2 is possible. However, it is also possible for the part 6 to be locked to the blade 2 only in the desired orientation, so that the side flank forming the support section 4 lies exactly in a support plane AE with the other support sections 4 of the blade 2 to be machined.

For sharpening or polishing, the cutting edge 2*a*, 3*a* of the blade 2, 3 to be machined is held in step B in abutment against a sharpening or polishing surface 5*a*, 5*b* of a sharpening or polishing device 5 such as a roller sharpener. In this context, the sharpening or polishing device 5 is moved along this cutting edge 2*a*, 3*a*, preferably alternately in a first direction leading toward the handle 2*c*, 3*c* of this blade 2, 3 and in a second direction leading away from the handle 2*c*, 3*c* of this blade 2, 3, or repeatedly in one of these two directions (cf. FIGS. 12 and 13).

After the sharpening or polishing of one blade 2 has been completed, the part 6 can be decoupled from the one blade 2 and coupled to the other blade 3 in order to support this blade 3 stably on the level surface U according to the same principle as described previously with reference to FIGS. 8 to 13 and illustrated with reference to the photographic illustrations in FIGS. 14 and 15.

In other words, the part 6 forms a support section 4 protruding along the axis X to support each of the blades 2, 3 in the sharpening configuration in a disassembled state of the cutting tool 1 at a constant working angle α on the surface U.

LIST OF REFERENCE SIGNS

1 cutting tool
2, 3 blade
2*a*, 3*a* cutting edge
2*b*, 3*b* blade body
2*c*, 3*c* handle
4 support section
5 sharpening or polishing device (roller sharpener)
5*a*, 5*b* sharpening or polishing surface
5*c* device body
6 part protruding along the axis (screw bolt)
6*a* vertex
6*b* flattening
7 part protruding along the axis (cap nut)
AE support plane
B direction of view parallel to the axis
P direction of view perpendicular to the support plane
U surface
X axis

What is claimed is:

1. A cutting tool, comprising:

two blades, each having a cutting edge and being movable relative to one another in a cutting configuration to cut a material, wherein the cutting tool can be reversibly transferred from the cutting configuration to a sharpening configuration in which:

the blades are separated from one another for sharpening and/or polishing the cutting edges by a sharpening or polishing device, and each of the blades can be individually placed onto a level surface so that the blade is oriented at a constant working angle in relation to the level surface, or the blades are locked relative to one another wherein at least one of the blades comprises a support section which defines a support plane upon which the blade can be stably deposited in the sharpening configuration on the level surface such that the blade is oriented at a working angle to the support plane in the range of 10° to 80°.

2. The cutting tool according to claim 1, wherein each of the blades comprises a support section which defines a support plane upon which the blade can be stably deposited in the sharpening configuration on the level surface, wherein the support plane lies outside a blade plane or protrudes above the blade plane to support the blade in the sharpening configuration, and wherein a maximum protrusion of the support section over the blade plane in the sharpening configuration is in the range of 20% to 90% of the maximum width of the blade.

3. The cutting tool according to claim 1, wherein at least one of the blades comprises at least three support sections which define a support plane upon which the blade can be stably deposited in the sharpening configuration on the level surface, and wherein the three support sections do not lie on one line.

4. The cutting tool according to claim 1, wherein at least one of the blades comprises a support section which defines a support plane upon which the blade can be stably deposited in the sharpening configuration on the level surface such that the cutting edge of the blade extends in a plane that is oriented at an angle of maximally 10° to the support plane.

5. The cutting tool according to claim 1, wherein at least one of the blades comprises a support section which defines a support plane upon which the blade can be stably deposited in the sharpening configuration on the level surface such that the cutting edge of the blade has a distance in the range of 5 to 50 mm from the support plane.

6. The cutting tool according to claim 1, wherein at least one of the blades comprises a support section which defines a support plane upon which the blade can be stably deposited in the sharpening configuration on the level surface such that when projected onto the support plane, the cutting edge of the blade, starting from an intersection with the other cutting edge, lies completely outside the other blade.

7. The cutting tool according to claim 1, wherein at least one of the blades comprises a support section which defines a support plane upon which the blade can be stably deposited in the sharpening configuration on the level surface, and wherein a blade body of the blade rests on a handle of the other blade when in the sharpening configuration.

8. The cutting tool according to claim 1, wherein at least one of the blades comprises a support section which defines a support plane upon which the blade can be stably deposited in the sharpening configuration on the level surface such that when projected onto the support plane, the support section lies below the blade and does not protrude above the blade or the cutting edge.

9. The cutting tool according to claim 1, wherein each of the blades comprises the cutting edge at a first end and a handle at a second end, and wherein the handle or a back of the blade facing away from the cutting edge comprises a support section upon which the blade can be stably deposited in the sharpening configuration on the level surface.

10. The cutting tool according to claim 9, wherein the cutting tool is scissors and the blades in the cutting configuration are arranged crosswise on an axis between the handle and the cutting edge of each blade and are rotatably mounted relative to one another such that the handles and the cutting edges of each blade are opposite one another, wherein the cutting tool comprises at least one support section upon which the blade can be stably deposited in the sharpening configuration on the level surface, the support section protruding along the axis and formed as part of the axis or detachably coupled to the cutting tool.

11. The cutting tool according to claim 10, wherein the axis for transferring the cutting tool between the cutting configuration and the sharpening configuration is detachable from at least one of the blades, so that the blades are separable from one another or lockable in a different configuration relative to one another.

12. The cutting tool according to claim 11, wherein the axis has a detachably couplable screw bolt and a matching cap nut, or the axis is attached to one of the blades and forms a male part of a bayonet lock which is detachably coupled to a female part of the bayonet lock on the other of the blades.

13. The cutting tool according to claim 9, wherein each of the blades includes a blade body comprising the cutting edge, wherein the blade body of one blade at least partially overlaps or contacts the handle of the other blade in the sharpening configuration, and wherein each of the handles has a handle opening, and the blade body of one blade at least partially covers the handle opening of the other blade in the sharpening configuration.

14. The cutting tool according to claim 1, wherein the blades in the cutting configuration are reversibly transferable between an open position in which the material can be arranged between the cutting edges and a closed position in which the cutting edges lie directly on top of one another, and wherein the cutting tool in the open position can be transferred to the sharpening configuration by locking the blades.

15. The cutting tool according to claim 1, wherein the cutting edges in the sharpening configuration define an opening angle in the range of 135° to 180°.

16. The cutting tool according to claim 1, wherein the blades are magnetically or mechanically locked in the sharpening configuration.

17. The cutting tool according to claim 1, wherein the blades can be detached from each other and coupled to each other in a different arrangement for transferring the cutting tool from the cutting configuration to the sharpening configuration.

18. The cutting tool according to claim 17, wherein blade bodies of the blades in the sharpening configuration are oriented in different, non-parallel planes, transversely or perpendicularly to one another.

19. A method for sharpening and/or polishing a cutting tool according to claim 1, the method comprising:

transferring the cutting tool from the cutting configuration to the sharpening configuration in which:

the blades are separated from each other and can each be individually placed onto the level surface so that the blade is oriented at the constant working angle in relation to the surface, or the blades are locked relative to one another;

sharpening and/or polishing at least one of the cutting edges in the sharpening configuration with the sharpening or polishing device; and transferring the cutting tool from the sharpening configuration to the cutting configuration.

20. The method according to claim 19, wherein the blade with the cutting edge to be sharpened and/or polished is supported on the other blade.

21. The method according to claim 19, wherein the blade with the cutting edge to be sharpened and/or polished is supported on the handle of the other blade.

22. The method according to claim 19, wherein the blade with the cutting edge to be sharpened and/or polished is supported on an end of the other blade facing away from the cutting edge.

23. The method according to claim 19, wherein the blade with the cutting edge to be sharpened and/or polished is held lying stably on the level surface so that the blade is oriented with its cutting edge at a working angle in the range from 10° to 80° to the level surface.

24. The method according to claim 19, wherein the cutting edge to be sharpened and/or polished is held in abutment against a sharpening or polishing surface of the sharpening or polishing device, and the sharpening or polishing device is thereby moved along the cutting edge alternately in a first direction and in a second, opposite, direction, or repeatedly in one of the first direction or the second direction.

25. The method according to claim 19, wherein sharpening and/or polishing at least one of the cutting edges comprises sharpening and/or polishing both of the cutting edges, sequentially, and wherein the positions of the blades are exchanged between the sharpening and/or polishing of one cutting edge and the sharpening and/or polishing of the other cutting edge, such that in each case the blade not being sharpened and/or polished supports the blade that is being sharpened and/or polished in the sharpening configuration.

* * * * *